(12) United States Patent
Yoshinaga et al.

(10) Patent No.: US 12,287,611 B2
(45) Date of Patent: Apr. 29, 2025

(54) METHOD OF MANUFACTURING WATCH COMPONENT AND WATCH COMPONENT

(71) Applicant: Seiko Epson Corporation, Tokyo (JP)

(72) Inventors: Ai Yoshinaga, Shiojiri (JP); Shohei Onodera, Yuza (JP)

(73) Assignee: SEIKO EPSON CORPORATION (JP)

( * ) Notice: Subject to any disclaimer, the term of this patent is extended or adjusted under 35 U.S.C. 154(b) by 619 days.

(21) Appl. No.: 17/456,232

(22) Filed: Nov. 23, 2021

(65) Prior Publication Data

US 2022/0171342 A1 Jun. 2, 2022

(30) Foreign Application Priority Data

Nov. 27, 2020 (JP) ................. 2020-197298

(51) Int. Cl.
*G04B 45/00* (2006.01)
*B23K 26/362* (2014.01)
*G04D 3/00* (2006.01)

(52) U.S. Cl.
CPC ........ *G04B 45/0076* (2013.01); *B23K 26/362* (2013.01); *G04D 3/0069* (2013.01)

(58) Field of Classification Search
None
See application file for complete search history.

(56) References Cited

U.S. PATENT DOCUMENTS

| | | | | |
|---|---|---|---|---|
| 5,072,091 A | * | 12/1991 | Nagata | B23K 26/06 219/121.75 |
| 2015/0049593 A1 | * | 2/2015 | Oliveira | B23K 26/06 219/121.69 |
| 2016/0263698 A1 | * | 9/2016 | Noirot | B23K 26/359 |
| 2016/0266551 A1 | * | 9/2016 | Oliveira | G04B 45/0076 |
| 2017/0266690 A1 | | 9/2017 | Shimada et al. | |
| 2019/0344606 A1 | * | 11/2019 | Aruga | B44C 1/228 |

FOREIGN PATENT DOCUMENTS

| | | | |
|---|---|---|---|
| CA | 2760161 A1 * | 11/2010 | ........ B23K 26/082 |
| JP | 11268500 A * | 10/1999 | |
| JP | 2003-075557 A | 3/2003 | |
| JP | 2004-269916 A | 9/2004 | |
| JP | 2006-297815 A | 11/2006 | |
| JP | 2011-107077 A | 6/2011 | |
| JP | 2016-117270 A | 6/2016 | |
| JP | 2019-195979 A | 11/2019 | |

OTHER PUBLICATIONS

Machine translation of JP-11268500-A, Nov. 2024 (Year: 2024).*

* cited by examiner

*Primary Examiner* — Geoffrey S Evans
(74) *Attorney, Agent, or Firm* — Harness, Dickey & Pierce, P.L.C.

(57) ABSTRACT

A method of manufacturing a watch component according to the present disclosure is a method of manufacturing a watch component that includes a decorative region at a front surface thereof. The method includes sequentially irradiating the decorative region with laser light to draw, in a superimposed manner, a plurality of decorative patterns constituted by a plurality of lines. At least one of the decorative patterns is constituted by the plurality of lines arranged at intervals in a range of 80% to 200% of a spot diameter of the laser light, at least one of the plurality of lines including a curved portion.

9 Claims, 10 Drawing Sheets

METHOD OF MANUFACTURING WATCH COMPONENT AND WATCH COMPONENT

The present application is based on, and claims priority from JP Application Serial Number 2020-197298, filed Nov. 27, 2020, the disclosure of which is hereby incorporated by reference herein in its entirety.

BACKGROUND

1. Technical Field

The present disclosure relates to a method of manufacturing a watch component, and to a watch component.

2. Related Art

JP-A-2019-195979 discloses application of a decoration by irradiating laser light onto an inner block and an outer block of a wristwatch.

In JP-A-2019-195979, by sequentially irradiating the laser light onto a decorative region on a front surface of the inner block and the outer block so as to draw, in a superimposed manner, a plurality of decorative patterns constituted by a plurality of lines, a pattern having a texture similar to a hairline pattern can be applied.

In JP-A-2019-195979, the decorative pattern is constituted by a combination of straight lines, and therefore, when the laser light is irradiated based on such a decorative pattern, since the straight-line pattern is applied to the inner block and the outer block, the impression becomes mechanical and does not sufficiently approximate a texture created by hand.

SUMMARY

A method of manufacturing a watch component according to an aspect of the present disclosure is a method of manufacturing a watch component including a decorative region at a front surface thereof. The method includes sequentially irradiating the decorative region with laser light to draw, in a superimposed manner, a plurality of decorative patterns constituted by a plurality of lines. At least one of the decorative patterns is constituted by the plurality of lines arranged at intervals in a range of 80% to 200% of a spot diameter of the laser light, at least one of the plurality of lines including a curved portion.

A watch component according to an aspect of the present disclosure is a watch component including a decorative region at a front surface thereof. Grooves are formed in the decorative region, an interval between the grooves being random, a width of the grooves being constant, and some of the grooves having a curved shape.

DESCRIPTION OF EXEMPLARY EMBODIMENTS

Embodiments

A watch 100 according to an embodiment of the present disclosure will be described below with reference to the drawings.

Figure 1:
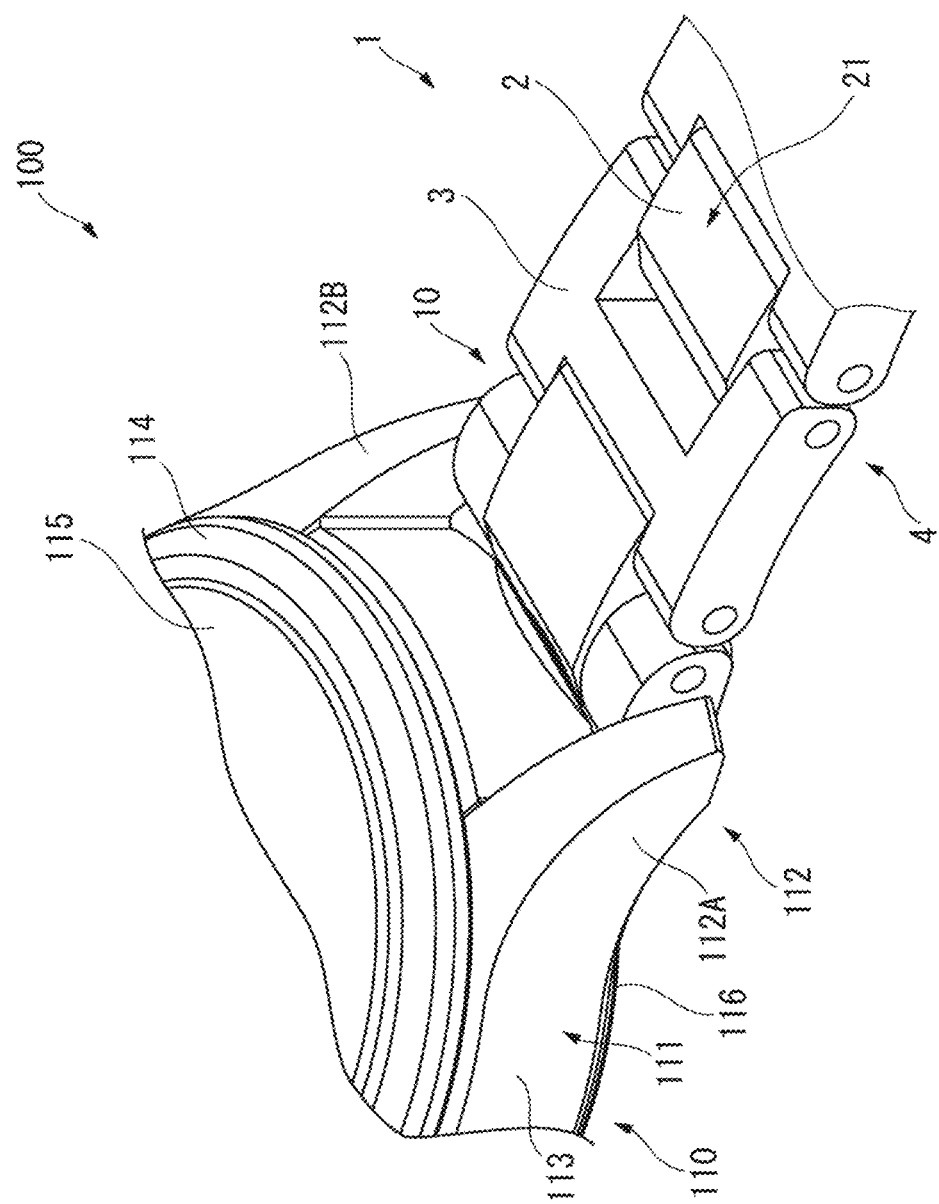
FIG. 1 is a perspective view illustrating main portions of a watch according to an embodiment.

FIG. 1 is a perspective view illustrating main portions of the watch 100 according to a first embodiment.

As shown in FIG. 1, the watch 100 includes a watch body 110 and a strap 1.

The watch body 110 includes a case 111 and bows 112.

The case 111 is provided with a case body 113, a bezel 114, a cover glass 115, and a case back 116.

The case body 113 is a cylindrical member formed of metal, and a dial and a movement (not illustrated) and the like are disposed inside the case body 113.

The bezel 114 is an annular member formed of metal and is disposed on an upper portion of the case body 113. The cover glass 115 is disposed so as to cover an opening on the upper side of the case body 113, is fixed by the bezel 114, and covers the dial (not illustrated). The case back 116 is a member formed of metal, and is disposed so as to cover an opening on the lower side of the case body 113.

The bows 112 are provided at the 6 o'clock direction and the 12 o'clock direction of the case body 113. Then, the bows 112 respectively include a pair of holding pieces 112A and 112B provided protruding from side surfaces of the case body 113. Further, holes (not illustrated) are provided in the holding pieces 112A and 112B, and a spring rod (not illustrated) of the strap 1 is inserted into the holes, thus coupling the watch main body 110 and the strap 1.

Strap

The strap 1 includes a strap main body 4 constituted by combining a plurality of middle blocks 2 and outer blocks 3 disposed so as to sandwich the middle blocks 2, and coupling tools 10 coupled to both end portions of the strap main body 4 and attached to the respective pairs of holding pieces 112A and 112B. In the embodiment, the middle block 2, the outer block 3, and the coupling tool 10 are constituted by metal members.

Note that FIG. 1 illustrates only the coupling tool 10 attached to the holding pieces 112A and 112B at the 6 o'clock direction of the watch 100.

Figure 2:
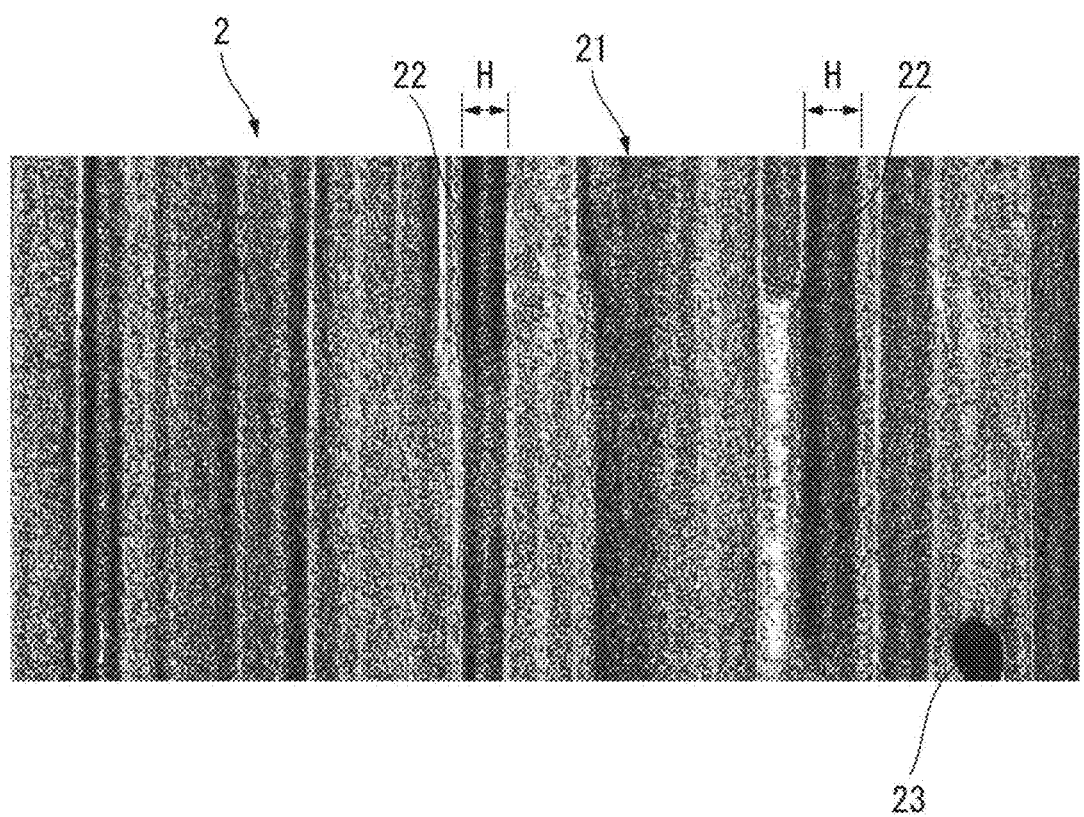
FIG. 2 is an enlarged view illustrating a decorative region of a watch component.

FIG. 2 is an enlarged view illustrating a decorative region 21 of the watch component.

In the embodiment, the decorative region 21 is provided on the front surface side of the watch components, such as the case 111, the bows 112, the bezel 114, the middle blocks 2 and the outer blocks 3 of the strap 1, namely, on the front surface on the side that is exposed when the watch body 110 is worn on an arm.

Scoring processing is performed on the decorative region 21 using laser light, to form a plurality of grooves 22 therein. In this way, a width H of each of the grooves 22 configuring the scored line is caused to be constant. Specifically, the width H of each of the grooves 22 is equal to or less than plus or minus 10% with respect to a spot diameter of the laser beam. In other words, if the spot diameter of the laser beam is 25 μm, the width H is from 22.5 μm to 27.5 μm.

Here, the spot diameter of the laser beam is the diameter when a region on the decorative region 21 that is irradiated with the laser beam at one moment is seen as a circle, and corresponds, for example, to a line width when a straight line is drawn by the laser light.

Further, in addition to the scored lines formed by the grooves 22 as described above, an abrasive grain trace 23 having a substantially circular shape is formed in the decorative region 21.

Note that the scoring processing using the laser light will be described in detail below.

Scoring Processing Method

Next, a method of performing the scoring processing on the watch component will be described.

Figure 3:
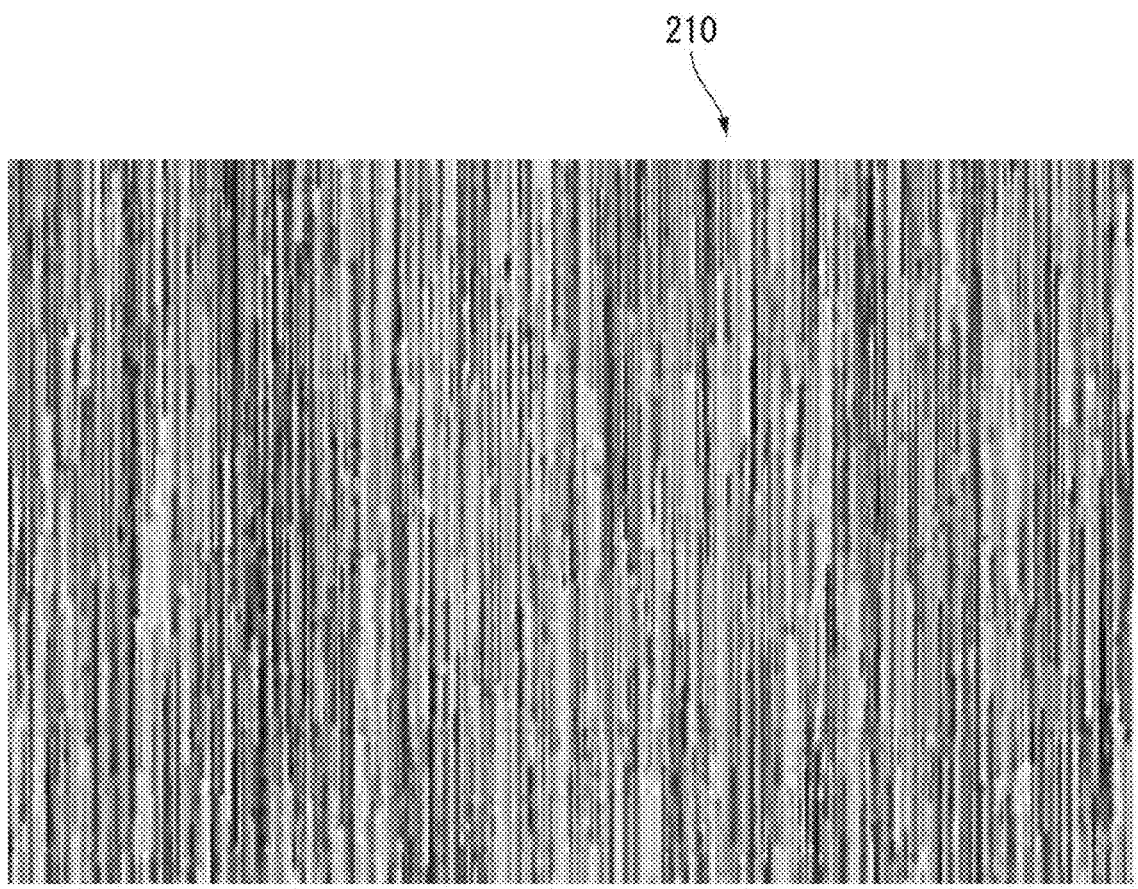
FIG. 3 is a diagram schematically illustrating a first decorative pattern.
Figure 4:
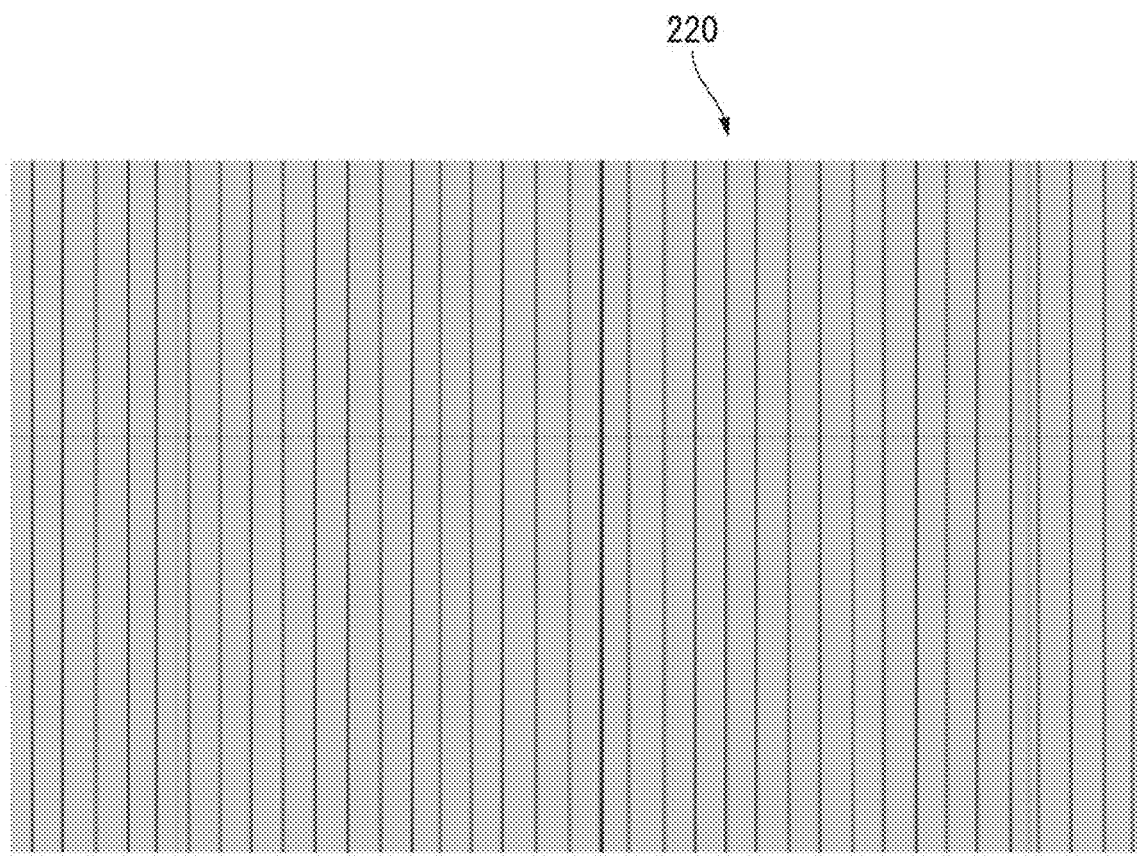
FIG. 4 is a diagram schematically illustrating a second decorative pattern.
Figure 5:
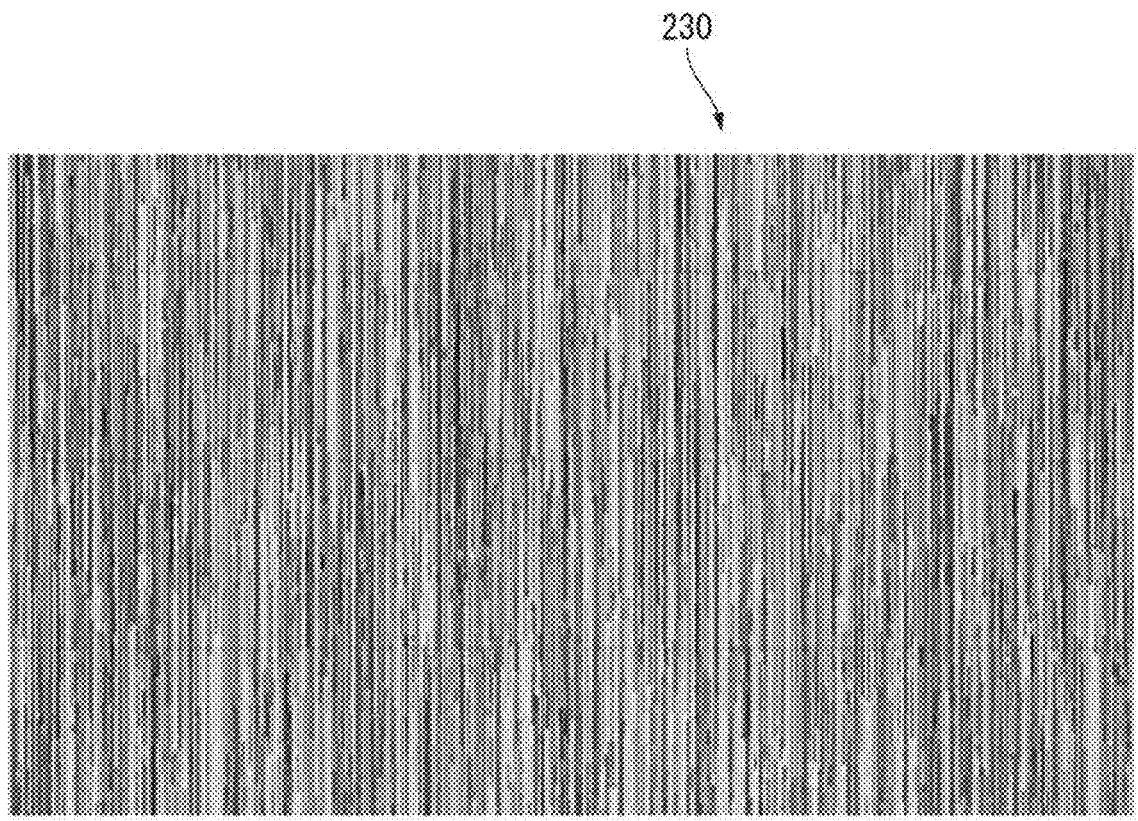
FIG. 5 is a diagram schematically illustrating a third decorative pattern.

FIG. 3 is a diagram schematically illustrating a first decorative pattern 210, FIG. 4 is a diagram schematically illustrating a second decorative pattern 220, and FIG. 5 is a diagram schematically illustrating a third decorative pattern 230.

As illustrated in FIG. 3 to FIG. 5, the first to third decorative patterns 210, 220, and 230 are constituted by a plurality of lines. Then, the watch component is subjected to the scoring processing by irradiating the decorative region 21 of the watch component with the laser light along the lines of the first to third decorative patterns 210, 220, and 230. In other words, the watch component is subjected to the scoring processing by sequentially irradiating the decorative region 21 of the watch component with the laser light so as to draw the first to third decorative patterns 210, 220, and 230 in a superimposed manner.

Each of the decorative patterns 210, 220, and 230 will be described below.

First Decorative Pattern

As illustrated in FIG. 3, the first decorative pattern 210 is constituted by the plurality of lines. In the embodiment, the plurality of lines configuring the first decorative pattern 210 are arranged without intersecting each other and such that an interval therebetween is random. More specifically, the plurality of lines are arranged such that the interval therebetween is random over a width that is from 80% to 200% of the spot diameter of the laser beam. For example, when the laser spot diameter is 25 μm, the plurality of lines are arranged so that the interval between the lines configuring the first decorative pattern 210 is random in a range of 20 μm to 50 μm.

By arranging the plurality of lines in such a range so that the interval between the plurality of lines is random, an expression having a higher degree of randomness is possible, since partially overlapping line segments are included, while suppressing the interval between the lines from becoming too wide. Thus, it is possible to realize the scoring processing that approximates a texture created by hand.

Note that in the present disclosure, "arranged at random" refers to a state in which there is no regularity with respect to the interval between the lines, and more specifically, refers to a state determined and arranged according to a random function.

Figure 6:
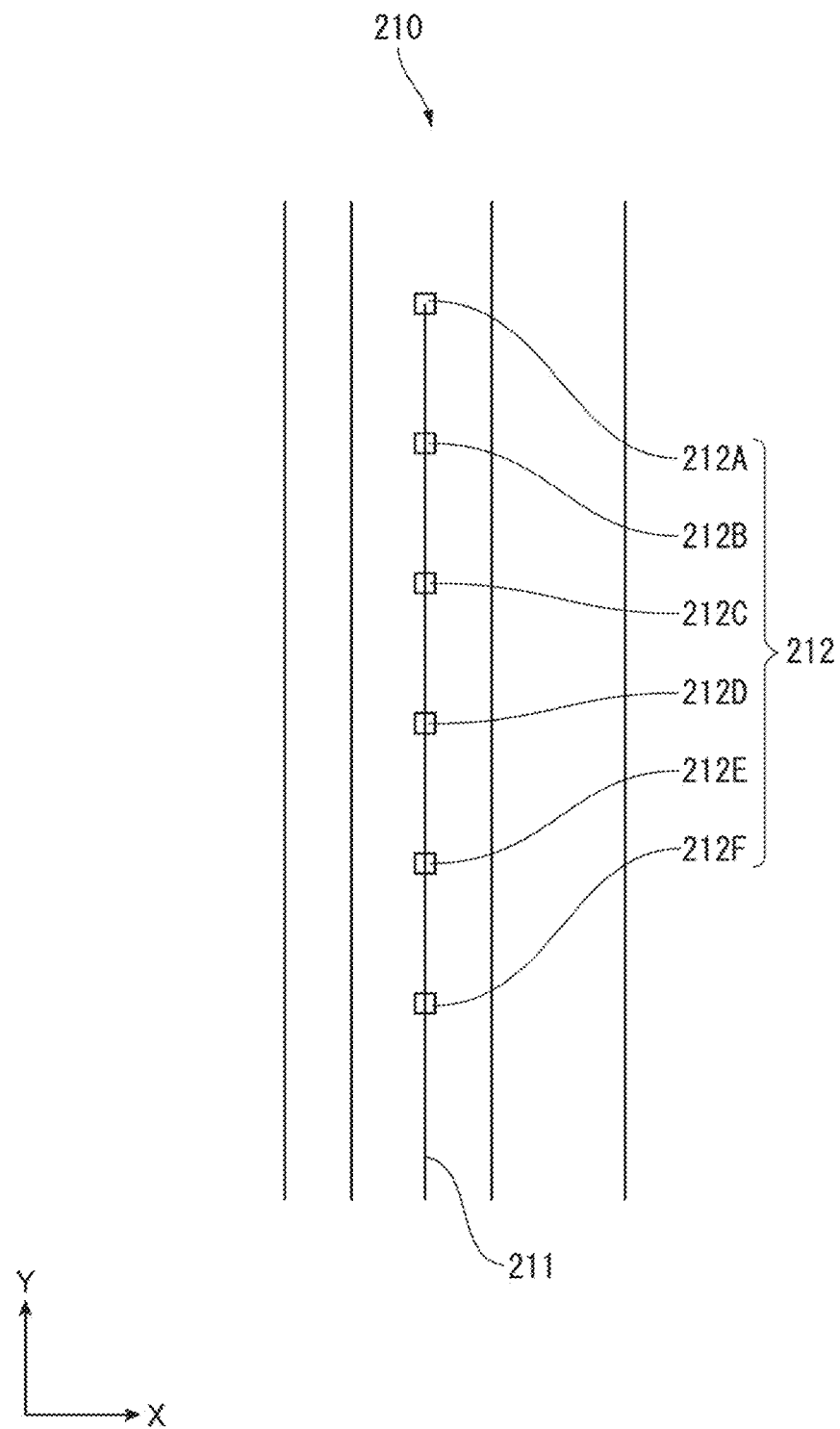
FIG. 6 is a diagram illustrating a process of forming a curved portion on a line configuring the first decorative pattern.
Figure 7:
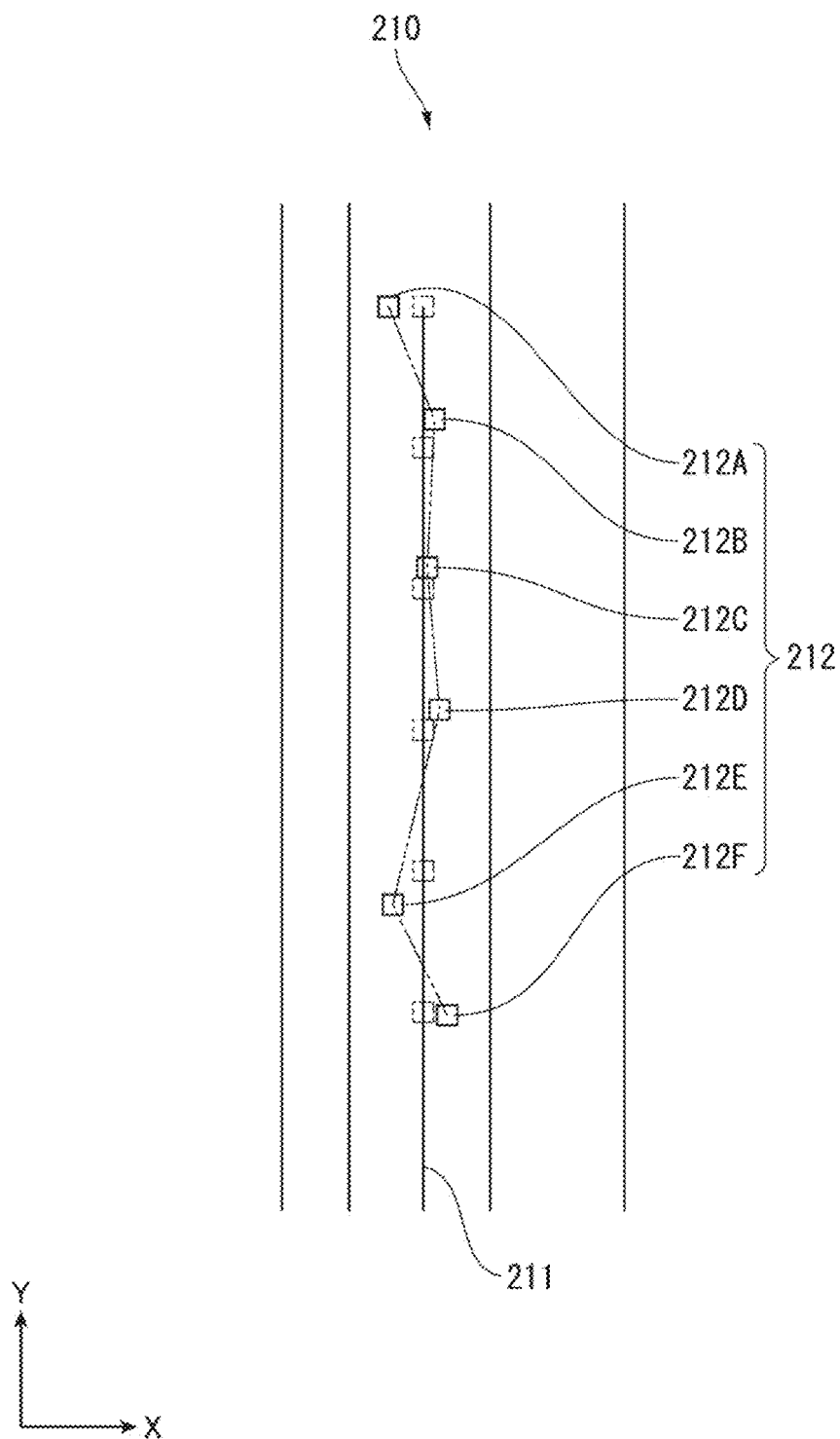
FIG. 7 is a diagram illustrating a process of forming a curved portion on a line configuring the first decorative pattern.
Figure 8:
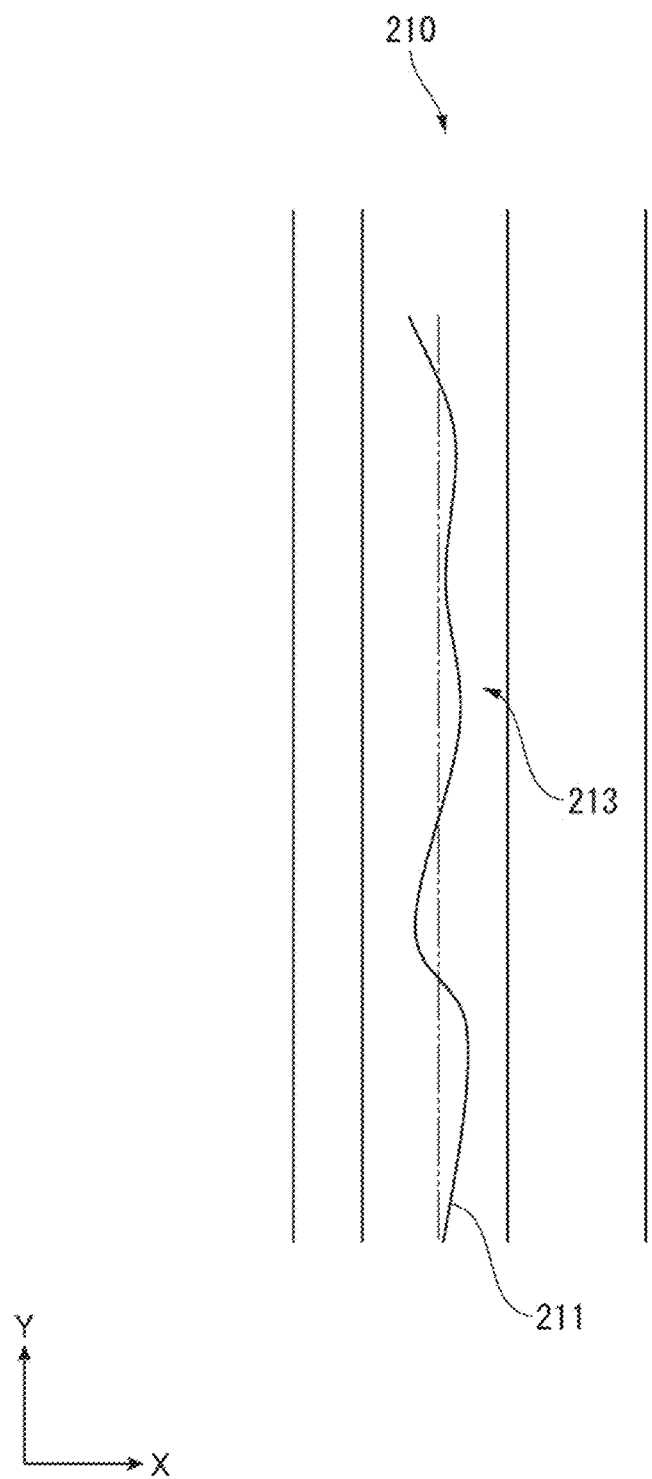
FIG. 8 is a diagram illustrating a process of forming a curved portion on a line configuring the first decorative pattern.

FIG. 6 to FIG. 8 are diagrams illustrating a process of forming a curved portion 213 on a line configuring the first decorative pattern 210. In the embodiment, at least one of the lines configuring the first decorative pattern 210 includes a plurality of the curved portions 213.

As illustrated in FIG. 6, a plurality of control points 212 are set in relation to a line 211 configuring the first decorative pattern 210. In the embodiment, as six of the control points 212, a first control point 212A, a second control point 212B, a third control point 212C, a fourth control point 212D, a fifth control point 212E, and a sixth control point 212F are set.

Here, in the embodiment, the control point 212 is a basis function of a non-uniform rational B-spline (NURBS), and is also referred to as a node.

Next, as illustrated in FIG. 7, each of the control points 212A to 212F set on the line 211 is moved in an X direction and a Y direction. Note that the X direction is a direction in which the line 211 extends, and the Y direction is a direction orthogonal to the X direction.

Here, in the embodiment, each of the control points 212A to 212F is randomly moved in the X direction by a distance in a range of 20% to 30% of the laser spot diameter, and in the Y direction by a distance in a range of 20% to 30% of the laser spot diameter. For example, when the laser spot diameter is 25 μm, the control points 212A to 212F are randomly moved in the X direction over a width of 5 μm to 7 μm and in the Y direction over a width of 5 μm to 7 μm.

In this way, a slight variation in the line can be expressed, and thus it is possible to even more closely approximate a texture created by hand.

Note that in the present disclosure, "randomly moved" refers to a state in which there is no regularity with respect to an amount of movement of each of the control points 212A to 212F, and more specifically, refers to a state in which the movement amount is determined according to a random function.

Then, as illustrated in FIG. 8, the line 211 is curved so that the line 211 satisfies a NURBS curve having each of the control points 212A to 212F as a control point. In other words, the line 211 is curved so that a given position of any point on the line 211 is a weighted linear sum of the positions of the control points 212 disposed to either side of the line 211. As a result, the curved portion 213 is formed on the line 211. In this way, the curved portion 213 is configured as a fifth order curve.

In the embodiment, the curved portion 213 is formed on all the lines configuring the first decorative pattern 210. In other words, the first decorative pattern 210 is constituted by the plurality of lines including at least one of the curved portions 213 between one end and another end of the line.

Note that the first decorative pattern 210 is not limited to the configuration described above, and may be configured, for example, by lines that do not include the curved portion 213 In other words, the first decorative pattern 210 may be constituted by a plurality of lines constituted by straight lines extending from one end to the other end, and by a plurality of lines including at least one of the curved portions 213 between the one end and the other end.

Figure 9:
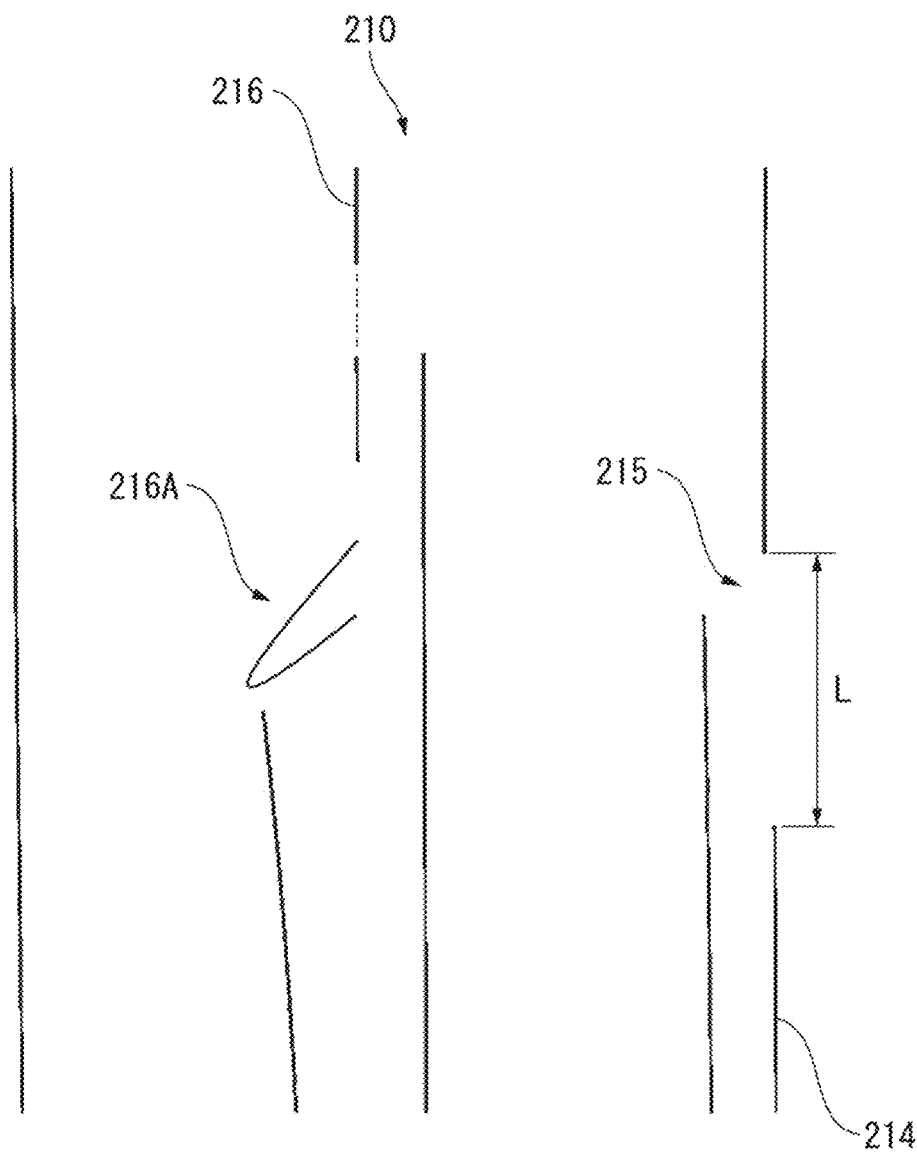
FIG. 9 is an enlarged view of a portion of the first decorative pattern.

FIG. 9 is an enlarged view of a portion of the first decorative pattern 210 illustrated in FIG. 3.

As illustrated in FIG. 9, a line 214 configuring the first decorative pattern 210 is partially divided.

Here, the line 214 is divided so that a length L of a divided section 215 is random. More specifically, the line 214 is divided such that the length L of the divided section 215 is an integral multiple of a minimum divided length N and is also random. In the embodiment, the minimum divided length N is set to 30 μm. In other words, a plurality of partially divided lines are configured such that the length L of the divided section 215 is an integral multiple of 30 µm.

Note that in the present disclosure, "dividing the line 214 so as to be random" can be realized, for example, by the length L of the divided section 215 being the integral multiple of 30 µm, and by being determined according to a random function.

Further, in a partially divided line 216, a location at which the length of the line is less than or equal to a first threshold is a rounded portion 216A that is rounded into a curved line. In the embodiment, the first threshold is set to 50 µm. Then, in the scoring processing, the abrasive grain trace 23 illustrated in FIG. 2 is formed at a location irradiated by the laser light along the rounded portion 216A.

Furthermore, as illustrated by a dotted line in FIG. 9, in the partially divided line 216, the line is erased at a location at which the length of the line is less than or equal to a second threshold. In the embodiment, the second threshold is set to 30 µm, which is lower than the first threshold.

Second Decorative Pattern

As illustrated in FIG. 4, the second decorative pattern 220 is constituted by the plurality of lines, as described above. In the embodiment, the lines configuring the second decorative pattern 220 are arranged so as to have a wider interval therebetween than the lines configuring the first decorative pattern 210. Further, the lines configuring the second decorative pattern 220 are constituted by straight lines extending from one end to the other end without intersecting each other. In other words, in the embodiment, the second decorative pattern 220 is constituted by the plurality of lines constituted by the straight lines extending from the one end to the other end.

Third Decorative Pattern

As illustrated in FIG. 5, the third decorative pattern 230 is constituted by the plurality of lines, as described above. In the embodiment, in a similar manner to the first decorative pattern 210, the lines configuring the third decorative pattern 230 are arranged without intersecting each other and such that an interval therebetween is random. Further, the lines configuring the third decorative pattern 230 are constituted by straight lines extending from one end to the other end, and a plurality of partially divided straight lines. In other words, the curved portion 213 described above is not formed on the lines constituting the third decorative pattern 230.

Scoring Processing by Laser Light

Next, the scoring processing using the laser light will be described.

Figure 10:
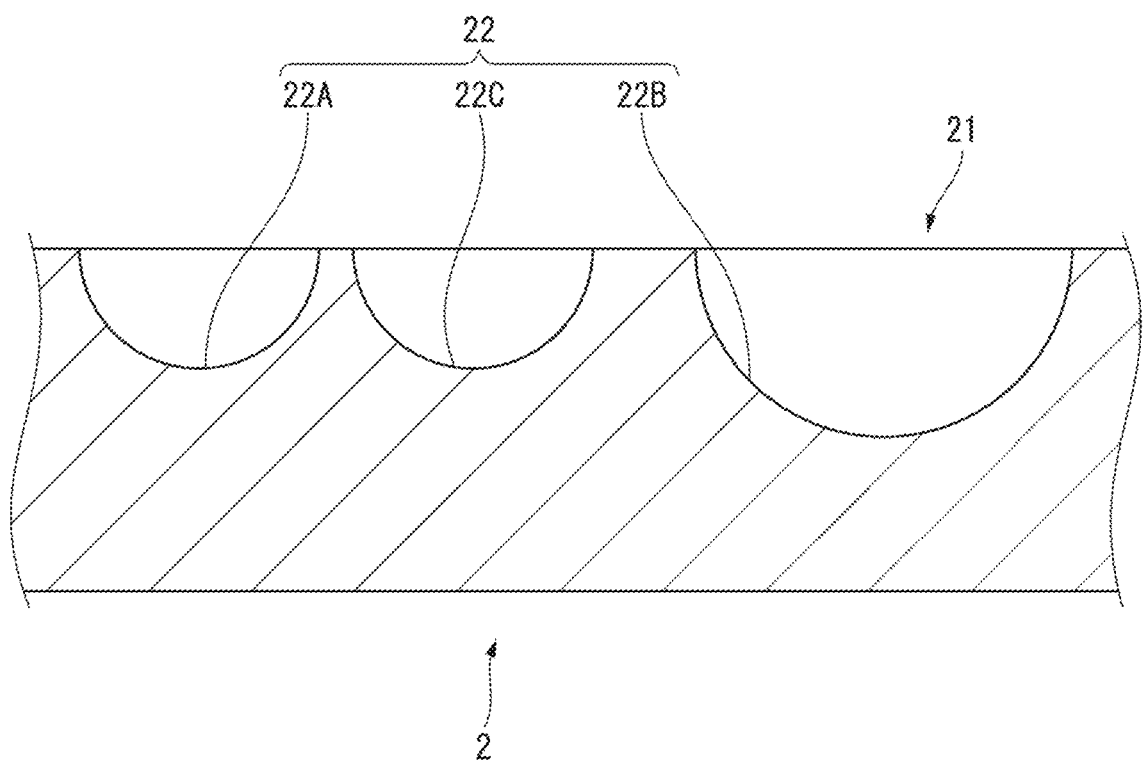
FIG. 10 is an enlarged cross-sectional view illustrating a portion of the decorative region of the watch component.

FIG. 10 is an enlarged cross-sectional view illustrating a portion of the decorative region 21 of the watch component.

First, the decorative region 21 of the watch component is irradiated with the laser light along the lines of the first decorative pattern 210. In other words, the first decorative pattern 210 is stored as data in a laser processing machine, and the decorative region 21 of the watch component is irradiated with the laser light based on the data. In this way, as illustrated in FIG. 10, first grooves 22A along the first decorative pattern 210 are formed in the decorative region 21 of the watch component.

Subsequently, the decorative region 21 of the watch component in which the first grooves 22A are formed along the first decorative pattern 210 is irradiated with the laser light along the lines of the second decorative pattern 220. At this time, a laser light irradiation output is adjusted so as to be larger than when the laser light is irradiated along the lines of the first decorative pattern 210. In this way, second grooves 22B, which have a depth greater than that of the first grooves 22A along the first decorative pattern 210, are formed in the decorative region 21 of the watch component.

Finally, the decorative region 21 in which the first grooves 22A along the first decorative pattern 210 and the second grooves 22B along the second decorative pattern 220 are formed is irradiated with the laser light along the lines of the third decorative pattern 230. At this time, in the embodiment, the laser light irradiation output is adjusted to be the same as when the laser light is irradiated along the lines of the first decorative pattern 210. In this way, third grooves 22C, which have a depth equal to that of the first grooves 22A along the first decorative pattern 210, are formed in the decorative region 21 of the watch component. Note that the width H of the first groove 22A, the second groove 22B, and the third groove 22C is from 22.5 µm to 27.5 µm, as described above.

Further, in FIG. 10, the first groove 22A, the second groove 22B, and the third groove 22C are each formed so as not to overlap, but the configuration is not limited thereto. At least some of the first grooves 22A, the second grooves 22B, and the third grooves 22C are formed so as to overlap.

As described above, in the embodiment, by sequentially irradiating the laser light so as to draw the first to third decorative patterns 210, 220, and 230 in the superimposed manner on the decorative region 21 of the watch component, the grooves 22 are formed for which the interval therebetween is random, for which the width H is constant, and for which some have the curved shape.

Effects of the Embodiment

According to the embodiment, the following advantageous effects can be obtained.

In the embodiment, in the first decorative pattern 210, the plurality of lines are arranged such that the interval therebetween is random, by a distance in a range of 80% to 200% of the spot diameter of the laser beam, and the lines 211 are configured to include the curved portions 213.

As a result, the grooves 22 for which the interval is random, for which the width H is constant, and of which some have the curved shape, can be formed by the laser light in the decorative region 21 of the watch component. Thus, compared to when the pattern is applied in a straight line manner, it is possible to more closely approximate a texture created by hand.

Furthermore, in the embodiment, the decorative region 21 of the watch component is sequentially irradiated with the laser light so as to draw the first to third decorative patterns 210, 220, and 230 in the superimposed manner.

In this way, at least some of the first grooves 22A, the second grooves 22B, and the third grooves 22C are formed so as to overlap, and thus, there are locations where the interval between the grooves 22 is smaller than the spot diameter of the laser beam. As a result, the scored lines are formed more finely, and decorativeness is thus improved. Furthermore, because a color tone changes between the regions where the grooves 22 are formed so as to overlap and the regions where the grooves 22 do not overlap, a more complex and delicate scored line pattern can be formed.

In the embodiment, the curved portion 213 is formed based on the plurality of control points 212.

In this way, it is possible to easily form the curved portion 213 having a complex shape.

In the embodiment, the control points 212 are moved in at least one of the X direction and the Y direction, by a distance in a range of 20% to 30% of the spot diameter.

In this way, it is possible to express a slight variation in the line, and it is thus possible to more closely approximate the texture created by hand.

In the embodiment, the first decorative pattern 210 and the third decorative pattern 230 include the divided section 215 by which at least one of the lines is divided, and the length of the divided section 215 is random.

In this way, the groove 22 formed in the decorative region 21 of the watch component can be divided, and the length of the division can be made random, thus making it possible to more closely approximate the texture created by hand.

In the embodiment, in the partially divided line 216, a location at which the length of the line is equal to or less than the first threshold value of 50 μm is rounded to form the rounded portion 216A.

In this way, in addition to the grooves 22, the abrasive grain trace 23 can be formed by the laser light in the decorative region 21 of the watch component. As a result, a mechanical impression can be further reduced, and it is thus possible to more closely approximate the texture created by hand.

In the embodiment, in the partially divided line 216, the line is erased at a location at which the length of the line is less than or equal to the second threshold.

In this way, the grooves 22 formed in the decorative region 21 of the watch component can be made more non-uniform. As a result, the mechanical impression can be further reduced, and it is thus possible to more closely approximate the texture created by hand.

In the embodiment, the output of the laser light is adjusted to be greatest when irradiating the laser light along the second decorative pattern 220 in which the interval between the lines is greatest.

In this way, the depth of the second grooves 22B formed in the decorative region 21 of the watch component can be increased such that the second grooves 22B can be easily seen. As a result, the scored lines can be more clearly delineated, and the decorativeness can thus be increased.

Modified Examples

Note that the present disclosure is not limited to the embodiment described above, and modifications, improvements, and the like within the scope in which the object of the present disclosure can be achieved are included in the present disclosure.

In the embodiment described above, the laser light is sequentially irradiated to draw the first decorative pattern 210, the second decorative pattern 220, and the third decorative pattern 230 in the superimposed manner, but the configuration is not limited thereto. For example, the laser light may be irradiated to draw two decorative patterns in the superimposed manner, or the laser light may be irradiated to draw four or more decorative patterns in the superimposed manner.

Further, in the embodiment described above, the laser light is irradiated in the order of the first decorative pattern 210, the second decorative pattern 220, and the third decorative pattern 230, but the configuration is not limited thereto. For example, the laser light may be irradiated in the order of the third decorative pattern, the second decorative pattern, and the first decorative pattern, or the order of the respective decorative region patterns may be changed.

In the embodiment described above, the curved portion is formed in a portion of the line configuring the first decorative pattern 210, but the configuration is not limited thereto. For example, the laser light may be irradiated to draw, in the superimposed manner, two or more of the decorative patterns configured to include the lines in which the curved portions are formed.

In the embodiment described above, the six control points 212 are set with respect to the line 211 configuring the first decorative pattern 210, but the configuration is not limited thereto. For example, as long as a plurality of the control points are set, three of the control points may be set, or 15 of the control points may be set.

In the embodiment described above, the plurality of lines configuring the first decorative pattern 210 are arranged such that the interval therebetween is random in a range of 80% to 200% of the laser spot diameter. For example, the plurality of lines configuring the first decorative pattern may be arranged so that the interval therebetween is random in a range of 0% to 200% of the laser spot diameter. By adopting this configuration, the plurality of lines can be arranged so as not to overlap or be superimposed on each other, and thus, a finer expression can be achieved by the scoring processing.

In the embodiment described above, in the partially divided line 216, the portion at which the length of the line is less than or equal to the first threshold is rounded to form the rounded portion 216A, but the configuration is not limited thereto. For example, the rounded portion need not necessarily be formed in the partially divided line. In other words, the abrasive grain trace need not necessarily be formed in the decorative region of the watch component.

In the embodiment described above, the output of the laser light is adjusted to be greatest when irradiating the laser light along the second decorative pattern 220 in which the interval between the lines is greatest, but the configuration is not limited thereto. For example, the output of all the laser light may be adjusted to be constant. In other words, the depth of the grooves formed in the decorative region of the watch component may be substantially constant.

Further, the output of the laser light may be adjusted to be different in each of the first decorative pattern, the second decorative pattern, and the third decorative pattern. Alternatively, the output of the laser beam may be constant, and adjustment may be performed to cause the amount of irradiation energy to differ, by changing a relative speed between the laser light and the decorative region 21, or by changing a distance between a laser light source and the decorative region.

In the embodiment described above, the case 111, the bows 112, the bezel 114, the middle blocks 2 and the outer blocks 3 of the strap 1, and the like are exemplified as the watch components, but the configuration is not limited thereto. For example, the watch component provided with the decorative region may be the dial, a minute hand, a main plate, an oscillating weight, a clasp, or the like.

In the embodiment described above, the decorative region 21 is provided on the front surface of the watch component, but the configuration is not limited thereto. A decorative region may be provided on the reverse side of the watch component, that is, on the back surface that comes into contact with the arm when the watch body 110 is worn on the arm, or a decorative region may be provided on a side surface of the watch body 110.

Further, a portion of the front surface of the watch component may be a decorative region, or the entire surface of the front surface may be a decorative region.

SUMMARY OF PRESENT DISCLOSURE

A method of manufacturing a watch component according to an aspect of the present disclosure is a method of manufacturing a watch component including a decorative region at a front surface thereof. The method includes sequentially irradiating the decorative region with laser light to draw, in a superimposed manner, a plurality of decorative patterns constituted by a plurality of lines. At least one of the decorative patterns is constituted by the plurality of lines arranged at intervals in a range of 80% to 200% of a spot diameter of the laser light, at least one of the plurality of lines including a curved portion.

In this way, in the decorative region of the watch component, grooves can be formed for which the interval therebetween is random, for which a width is constant, and for which some have a curved shape. Thus, compared to when the pattern is applied in a straight line manner, it is possible to more closely approximate a texture created by hand.

Furthermore, because at least some of the plurality of grooves are formed so as to overlap, there is a location where the interval between the grooves is smaller than the spot diameter of the laser beam. As a result, the scored lines are formed more finely, and decorativeness is thus improved. Furthermore, a more complex and delicate muscle pattern can be formed because the coloration changes between the regions where the grooves are formed overlapping with the regions where the grooves are not overlapped.

In the method of manufacturing a clock piece of the present disclosure, the curved portion may be formed based on a plurality of control points.

This makes it possible to easily form a curvilinear part with a complex shape.

In the method for manufacturing a watch component of the present disclosure, the control point may be moved at a width of at least 20% and at most 30% relative to the spot diameter.

In this way, it is possible to express a slight variation in the line, and it is thus possible to more closely approximate a texture created by hand.

In the method of manufacturing the watch component according to the present disclosure, at least one of the decorative patterns may include a divided section dividing at least one of the plurality of lines, and a length of the divided section may be set to be random.

In this way, the groove formed in the decorative region of the watch component can be divided, and the length at which is divided can be made random, thus making it possible to more closely approximate the texture created by hand.

In the method of manufacturing the watch component according to the present disclosure, of the at least one of the plurality of lines including the divided section, a line having a length no more than a first threshold value may be rounded into a curved shape to form a rounded portion.

In this way, in addition to the grooves, an abrasive grain trace can be formed by the laser light in the decorative region of the watch component. As a result, a mechanical impression can be further reduced, and it is thus possible to more closely approximate the texture created by hand.

In the method of manufacturing the watch component according to the present disclosure, of the at least one of the plurality of lines including the divided section, a line having a length no more than a second threshold value smaller than the first threshold value may be erased.

In this way, the grooves formed in the decorative region of the watch component can be made more non-uniform. As a result, the mechanical impression can be further reduced, and it is thus possible to more closely approximate the texture created by hand.

In the method of manufacturing the watch component according to the present disclosure, of the plurality of decorative patterns, an output of the laser light may be adjusted to be greatest when irradiating the laser light along the decorative pattern having the largest interval between the lines.

In this way, a depth of some of the grooves formed in the decorative region of the watch component can be made deeper, such that the grooves can be easily seen. Thus, the decorativeness can be further improved.

A watch component according to the present disclosure is a watch component including a decorative region at a front surface thereof. Grooves are formed in the decorative region, an interval between the grooves being random, a width of the grooves being constant, and some of the grooves having a curved shape.

In this way, in the watch component decorated using laser light, it is possible to approximate a texture created by hand.

What is claimed is:

1. A method of manufacturing a watch component including a decorative region at a front surface thereof, the method comprising:
    irradiating the decorative region with laser light to draw a first decorative pattern constituted by a first plurality of lines;
    after drawing the first decorative pattern, irradiating the decorative region with the laser light to draw a second decorative pattern constituted by a second plurality of lines, the second decorative pattern being superimposed on the first decorative pattern; and
    after drawing the second decorative pattern, irradiating the decorative region with the laser light to draw a third decorative pattern constituted by a third plurality of lines the third decorative pattern being superimposed on each of the first decorative pattern and the second decorative pattern,
    wherein at least one of the first, second, and third decorative patterns is constituted by the plurality of lines arranged at random intervals in a range of 80% to 200% of a spot diameter of the laser light, at least one of the plurality of lines including a curved portion.

2. The method of manufacturing the watch component according to claim 1, wherein
    the curved portion is formed based on a plurality of control points.

3. The method of manufacturing the watch component according to claim 2, wherein
    the control point is moved by a distance in a range of 20% to 30% of the spot diameter.

4. The method of manufacturing the watch component according to claim 1, wherein
    at least one of the first, second, and third decorative patterns includes a divided section where at least one of the plurality of lines is divided, and a length of the divided section is random.

5. The method of manufacturing the watch component according to claim 4, wherein
    of the at least one line including the divided section, a line having a length no more than a first threshold value is rounded into a curved shape to form a rounded portion.

6. The method of manufacturing the watch component according to claim 5, wherein
    of the at least one line including the divided section, a line having a length no more than a second threshold value smaller than the first threshold value is erased.

7. The method of manufacturing the watch component according to claim 1, wherein an output of laser light is adjusted to be greatest when laser light irradiation is performed along a decorative pattern having a largest interval between the lines among a plurality of decorative patterns.

8. A method of manufacturing a watch component including a decorative region at a front surface thereof, the method comprising:

sequentially irradiating the decorative region with laser light to draw, in a superimposed manner, a plurality of decorative patterns constituted by a plurality of lines, wherein at least one of the decorative patterns is constituted by the plurality of lines arranged at random intervals in a range of 80% to 200% of a spot diameter of the laser light, at least one of the plurality of lines including a curved portion;

at least one of the decorative patterns includes a divided section where at least one of the plurality of lines is divided, and a length of the divided section is random;

of the at least one line including the divided section, a line having a length no more than a first threshold value is rounded into a curved shape to form a rounded portion; and of the at least one line including the divided section, a line having a length no more than a second threshold value smaller than the first threshold value is erased.

9. A method of manufacturing a watch component including a decorative region at a front surface thereof, the method comprising:

sequentially irradiating the decorative region with laser light to draw, in a superimposed manner, a plurality of decorative patterns constituted by a plurality of lines, wherein at least one of the decorative patterns is constituted by the plurality of lines arranged at random intervals in a range of 80% to 200% of a spot diameter of the laser light, at least one of the plurality of lines including a curved portion; and wherein an output of laser light is adjusted to be greatest when laser light irradiation is performed along a decorative pattern having a largest interval between the lines among a plurality of decorative patterns.

\* \* \* \* \*